Feb. 18, 1936.     W. E. KÜHLE     2,031,112
POWER TUBE
Filed March 4, 1931
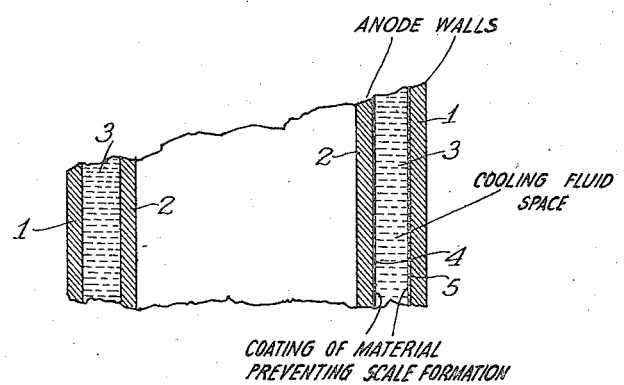
INVENTOR
WILHELM EBERHARD KÜHLE
BY
ATTORNEY Patented Feb. 18, 1936

2,031,112

UNITED STATES PATENT OFFICE 2,031,112

POWER TUBE

Wilhelm Eberhard Kühle, Berlin, Germany, assignor to Telefunken Gesellschaft für Drahtlose Telegraphie m. b. H., Berlin, Germany, a corporation of Germany Application March 4, 1931, Serial No. 520,061
In Germany March 7, 1930

1 Claim. (Cl. 250—27.5)

This invention relates to an arrangement for the protection of heated metal bodies in flow-contact with flowing water.

The present invention is concerned with ways and means adapted to preclude incrustations or boiler scale on the surface of heated metal parts in contact with flowing water, especially the electrodes of electron discharge tubes of large power. This formation of scale or incrustations is particularly noticeable in such electrodes as the anodes.

It has been found that such incrustation will happen only when a reaction takes place simultaneously between the surface of the metal and oxygen. According to the present invention as illustrated in the accompanying drawing, which is a vertical cross section of the hollow anode portion of a fluid cooled vacuum tube. The hollow anode walls 1 and 2, which may be either or both anode or cathode electrodes, are cooled by a flow of cooling fluid 3 circulating within the space formed by the anode walls. The protective wall coatings are indicated by 4 and 5, these wall coatings 4 and 5 are attached to the walls 1 and 2 by any suitable means. I prefer a metal for the surface of the body to be protected which metal or material exhibits but low chemical affinity to oxygen, for instance, tin or a metal possessing still more marked electronegative characteristics. Tin is particularly suitable, a coat of tin is technically very easily fastened upon base metals such as iron and copper.

I claim:

An electron discharge power tube having electrodes, at least one of said electrodes having hollow double iron walls, and a liquid cooling means within said hollow walls having a coating of tin to protect the iron walls from the formation of incrustations where said hollow walls are in contact with the cooling liquid.

WILHELM EBERHARD KÜHLE.